United States Patent
Seno et al.

(10) Patent No.: US 12,237,553 B2
(45) Date of Patent: Feb. 25, 2025

(54) CELL, CELL STACK DEVICE, MODULE, AND MODULE HOUSING DEVICE

(71) Applicant: KYOCERA Corporation, Kyoto (JP)

(72) Inventors: Hiroaki Seno, Kirishima (JP); Tetsuro Fujimoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 606 days.

(21) Appl. No.: 17/601,772

(22) PCT Filed: Apr. 23, 2020

(86) PCT No.: PCT/JP2020/017521
§ 371 (c)(1),
(2) Date: Oct. 6, 2021

(87) PCT Pub. No.: WO2020/218431
PCT Pub. Date: Oct. 29, 2020

(65) Prior Publication Data
US 2022/0200033 A1  Jun. 23, 2022

(30) Foreign Application Priority Data

Apr. 24, 2019  (JP) ................................ 2019-083010

(51) Int. Cl.
*H01M 8/1213* (2016.01)
*H01M 8/1226* (2016.01)
*H01M 8/2475* (2016.01)

(52) U.S. Cl.
CPC ....... *H01M 8/1213* (2013.01); *H01M 8/1226* (2013.01); *H01M 8/2475* (2013.01)

(58) Field of Classification Search
CPC .... H01M 8/1213; H01M 8/2475; H01M 8/24; H01M 8/20
See application file for complete search history.

(56) References Cited

U.S. PATENT DOCUMENTS 6,123,898 A * 9/2000 Taimatsu ................ C22C 38/22
420/583
2013/0004881 A1  1/2013 Shaigan et al.
(Continued)

FOREIGN PATENT DOCUMENTS

CN  103003465 A  3/2013
EP  3605692 A1  2/2020
(Continued)

OTHER PUBLICATIONS

Shaigan et al., "A review of recent progress in coatings, surface modifications and alloy developments for solid oxide fuel cell ferritic stainless steel interconnects", Journal of Power Sources, Elsevier, Amsterdam, NL., vol. 195 No. 6, Mar. 15, 2010, pp. 1529-1542, www.elsevier.com/locate/jpowsour.
Fontana et al., "Metallic Interconnects for Solid Oxide Fuel Cell: Performance of Reactive Element Oxide Coating During 10, 20 and 30 Months Exposure", Oxidation of Metals, Kluwer Academic Publishers-Plenum Publishers, NE, vol. 78, No. 5-6, Jul. 19, 2012, pp. 307-328, XP035133307, DOI 10.1007/s11085-012-9308-4.
(Continued)

*Primary Examiner* — Kenneth J Douyette
(74) *Attorney, Agent, or Firm* — Procopio, Cory, Hargreaves & Savitch LLP

(57) ABSTRACT

A cell includes a metal plate including a first surface, and a second surface that faces the first surface, the metal plate containing Cr, an element portion disposed on the metal plate, the element portion including a first electrode layer, a solid electrolyte layer located on the first electrode layer, and a second electrode layer located on the solid electrolyte layer, and a first intermediate layer located between the first surface of the metal plate and the first electrode layer. The first intermediate layer contains $Cr_2O_3$ and a first electrically conductive particle different from $Cr_2O_3$.

17 Claims, 14 Drawing Sheets

(56) References Cited

U.S. PATENT DOCUMENTS

| | | |
|---|---|---|
| 2013/0209917 A1 | 8/2013 | Himeno et al. |
| 2019/0088969 A1 | 3/2019 | Koizumi et al. |
| 2021/0194014 A1 | 6/2021 | Echigo et al. |

FOREIGN PATENT DOCUMENTS

| | | |
|---|---|---|
| JP | H10-172590 A | 6/1998 |
| JP | 2012-212651 A | 11/2012 |
| JP | 2015-122224 A | 7/2015 |
| JP | 2016-115506 A | 6/2016 |
| JP | 2016-195101 A | 11/2016 |
| JP | 2017-112045 A | 6/2017 |
| JP | 2018-160368 A | 10/2018 |
| WO | 2011/113139 A1 | 9/2011 |
| WO | 2017/022762 A1 | 2/2017 |
| WO | 2018/174167 A1 | 9/2018 |

OTHER PUBLICATIONS

Gil et al., "Improving the Oxidation Resistance and Electrical Properties of Ferritic Stainless Steels for Application in SOFC Interconnects", Oxidation of Metals, Springer New York LLC, US, vol. 85, No. 1, Dec. 10, 2015, pp. 151-169, XP035927334, DOI 10.1007/s11085-015-9605-9.

Huang et al., "Reduced area specific resistance for iron-based metallic interconnects by surface oxide coatings", Materials Research Bulletin, Elsevier, Kidlington, GB, vol. 36, No. 1-2, Jan. 3, 2001, pp. 81-95, XP004233427, DOI: 10.1016/S0025-5408(01)00506-2.

Linder et al., "Ohmic resistance of nickel infiltrated chromium oxide scales in solid oxide fuel cell metallic interconnects", Solid State Ionics, vol. 283, ELSEVIER, Nov. 12, 2015, pp. 38-51.

* cited by examiner

CELL, CELL STACK DEVICE, MODULE, AND MODULE HOUSING DEVICE

CROSS-REFERENCE TO RELATED APPLICATION(S)

This application is a national stage application of International Application No. PCT/JP2020/017521, filed on Apr. 23, 2020, which designates the United States, the entire contents of which are herein incorporated by reference, and which is based upon and claims the benefit of priority to Japanese Patent Application No. 2019-083010, filed on Apr. 24, 2019, the entire contents of which are herein incorporated by reference.

TECHNICAL FIELD

The present disclosure relates to a cell, a cell stack device, a module, and a module housing device.

BACKGROUND ART

In recent years, in fuel cell devices used as next-generation energy sources, for example, a cell in which a fuel electrode layer, a solid electrolyte layer, and an air electrode layer are layered on a porous support body is used. A ceramic material, a metal material, or the like is used for the support body. For the metal support body, a metal material such as ferritic stainless steel having high thermal resistance and corrosion resistance is used, and a metal sintered body obtained by sintering a powder of the metal material or a metal plate having through holes is used. For example, Patent Document 1 discloses a solid oxide fuel cell (SOFC) using a porous metal containing Fe and Cr as a support body.

CITATION LIST

Patent Document

Patent Document 1: JP 2016-115506 A

SUMMARY

A cell of the present disclosure includes a metal plate including a first surface, and a second surface that faces the first surface, the metal plate containing Cr, an element portion disposed on the first surface, the element portion including a first electrode layer, a solid electrolyte layer located on the first electrode layer, and a second electrode layer located on the solid electrolyte layer, and a first intermediate layer located between the first surface and the first electrode layer. The first intermediate layer contains $Cr_2O_3$ and a first conductive particle different from $Cr_2O_3$.

A cell stack device of the present disclosure includes a cell stack including a plurality of cells, the plurality of cells including the above-mentioned cell.

A module of the present disclosure includes a housing container and the above-mentioned cell stack device housed in the housing container.

A module housing device of the present disclosure includes an external case, the above-mentioned module housed in the external case, and an auxiliary device housed in the external case, and configured to operate the module.

DESCRIPTION OF EMBODIMENTS

Cell

Figure 1:
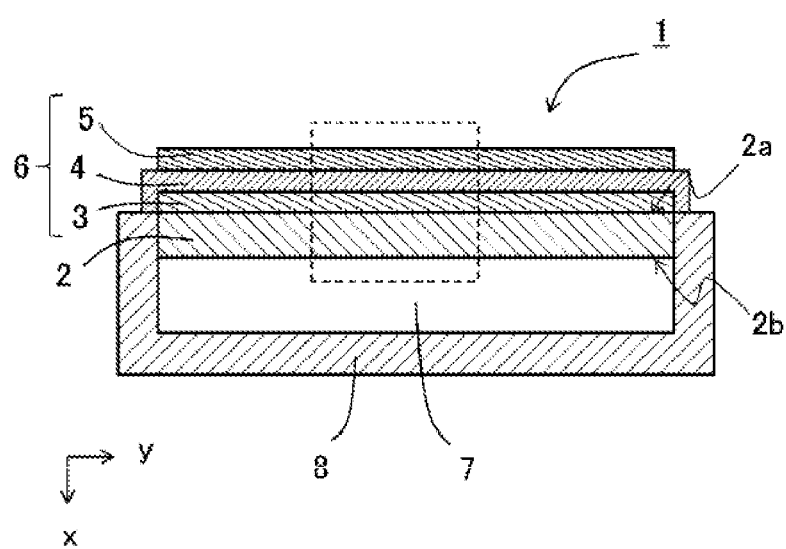
FIG. 1 is a cross-sectional view illustrating a cross section of one example of a cell.

FIG. 1 illustrates a cross section of one example of a cell with a metal support body. A cell 1 includes a metal support body and an element portion 6, the metal support body having a metal plate 2 having a pair of surfaces, which are a first surface 2a and a second surface 2b that face each other, and a flow path member 8. The element portion 6 is disposed on the first surface of the metal plate 2, and includes a first electrode layer 3, a solid electrolyte layer 4, and a second electrode layer 5. The first electrode layer 3 is disposed on the first surface of the metal plate 2, the solid electrolyte layer 4 is disposed on the first electrode layer 3, and the second electrode layer 5 is disposed on the solid electrolyte layer 4.

The metal support body has a gas-flow passage 7 formed by the second surface 2b and the flow path member 8. The second surface 2b is on the opposite side to the first surface 2a of the metal plate 2 on which the element portion 6 is disposed.

The metal plate 2 has gas permeability that allows a gas flowing through the gas-flow passage 7 to permeate to the first electrode layer 3. The flow path member 8 has a gas blocking property that prevents gas from flowing between the gas-flow passage 7 and the outside of the cell 1, that is, prevents mixing of fuel gas and oxygen-containing gas such as air. In the example illustrated in FIG. 1, the gas-flow passage 7 is formed by the metal plate 2 and the flow path member 8 having a U-shaped cross-section.

The solid electrolyte layer 4 may cover all the surfaces of the first electrode layer 3 that are not in contact with the metal plate 2. The solid electrolyte layer 4 and the flow path member 8 may form a tubular body. Further, a surface of the first electrode layer 3 that is not in contact with the metal plate 2 or the solid electrolyte layer 4 may be covered with another member having no gas permeability.

Hereinafter, the same members will be designated by the same reference numerals in other figures. Note that, in each figure, each layer is enlarged in the thickness direction for ease of explanation, and the actual thickness of each layer is very thin relative to the size of the cell 1. Further, in order to clarify the arrangement of each of the members constituting the cell 1, coordinate axes of xyz are set.

Hereinafter, unless otherwise specified, the first electrode layer 3 located between the metal plate 2 and the solid electrolyte layer 4 will be referred to as a fuel electrode, and the second electrode layer 5 located on the solid electrolyte layer 4 will be referred to as an air electrode. Fuel gas such as hydrogen-containing gas is supplied to the gas-flow passage 7, that is, the second surface 2b side, which is the lower side of the metal plate 2 illustrated in FIG. 1, and oxygen-containing gas such as air is supplied to the upper side of the second electrode layer 5 which is the air electrode. Note that the first electrode layer 3 may be the air electrode and the second electrode layer 5 may be the fuel electrode. In this case, the oxygen-containing gas such as air is supplied to the lower side of the metal plate 2 of the cell 1 illustrated in FIG. 1, and the fuel gas such as the hydrogen-containing gas is supplied to the upper side of the second electrode layer 5 which is the fuel electrode.

The cell 1 may be, for example, a solid oxide cell 1. The solid oxide cell 1 has high power generation efficiency as a fuel cell, whereby the entire power generation device can be reduced in size. In addition, the solid oxide cell 1 can perform load following operation, and can follow the fluctuating load required for, for example, a household fuel cell.

As the fuel electrode, a material commonly known as a fuel electrode may be used. The fuel electrode may contain a porous conductive ceramic such as stabilized zirconia and Ni and/or NiO. Stabilized zirconia is, for example, $ZrO_2$ in which magnesium (Mg), calcium (Ca), or a rare earth element is present in solid solution, and also includes partially stabilized zirconia. The rare earth element in the present disclosure includes yttrium (Y).

The solid electrolyte layer 4 is an electrolyte that transfers electric charges between the first electrode layer 3 and the second electrode layer 5. The solid electrolyte layer 4 has a gas blocking property so that the fuel gas and the oxygen-containing gas such as air do not mix with each other. The material of the solid electrolyte layer 4 is not limited as long as the material is an electrolyte having a gas blocking property, and may be $ZrO_2$ in which, for example, 3 mol % to 15 mol % of a rare earth element oxide is present in solid solution.

As the air electrode, a material commonly used as an air electrode may be used. The air electrode may be, for example, a so-called $ABO_3$ perovskite oxide conductive ceramic. The air electrode has gas permeability. The open porosity of the air electrode may be 20% or more, in particular, in a range of from 30% to 50%.

The metal plate 2 has electrical conductivity. Since the metal plate 2 has electrical conductivity, electricity generated in the element portion 6 can be collected. The conductivity of the metal plate 2 may be, for example, 3.0 S/m or more, particularly 4.4 S/m or more.

Further, the metal plate 2 is configured to allow gas to flow between the first surface 2a and the second surface 2b. In other words, the metal plate 2 has gas permeability between the first surface 2a and the second surface 2b. Since the metal plate 2 has gas permeability, the fuel gas supplied to the gas-flow passage 7 can reach the first electrode layer 3 which is the fuel electrode.

Figure 2:
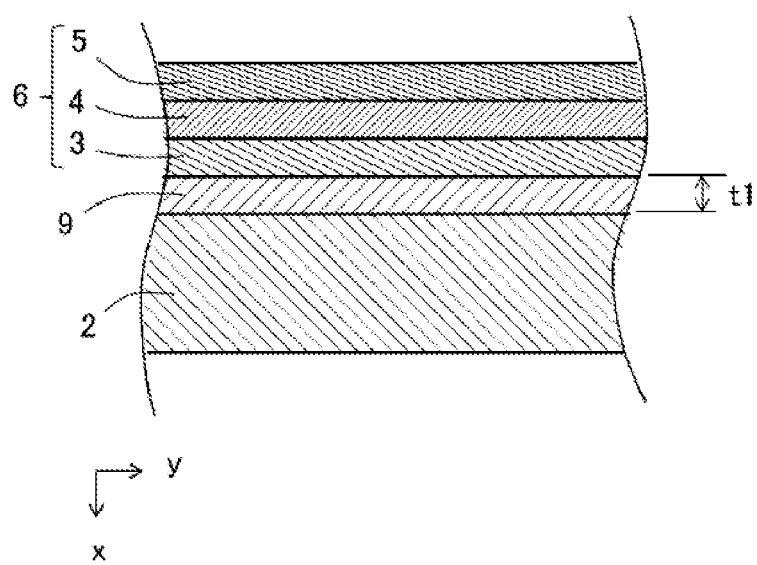
FIG. 2 is an enlarged cross-sectional view illustrating a portion surrounded by a dashed line in the one example in FIG. 1.
Figure 3:
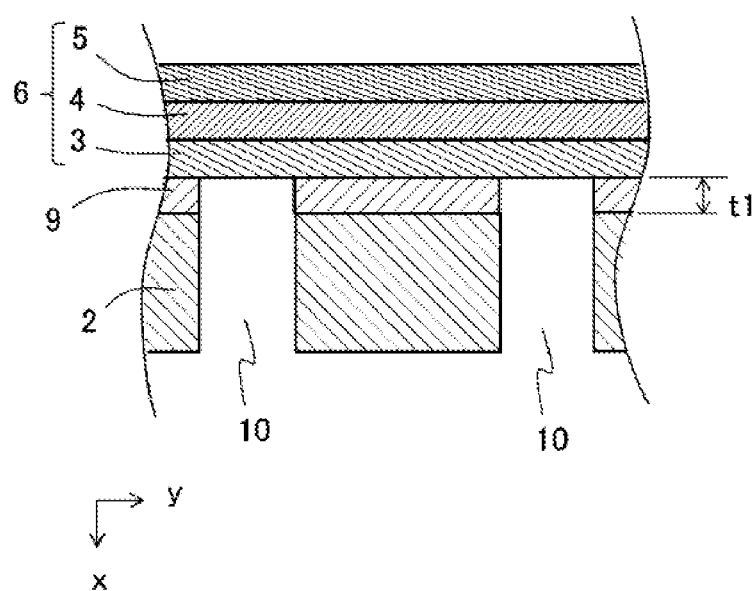
FIG. 3 is an enlarged cross-sectional view illustrating the portion surrounded by the dashed line in the one example in FIG. 1.

FIGS. 2 and 3 are enlarged cross-sectional views of a portion surrounded by a dashed line in FIG. 1. The metal plate 2 may be a flat plate-shaped porous body having an open porosity of, for example, 30% or more, particularly in a range of from 35% to 50%. Further, as illustrated in FIG. 3, the metal plate 2 may be a dense plate having a plurality of through holes 10 passing through the metal plate 2 in the thickness direction. Each of the through holes 10 may have, for example, a diameter of 0.01 mm or more and 1.0 mm or less in a cross-section perpendicular to the thickness direction of the metal plate 2. By having such open porosity or the through holes 10 in the metal plate 2, the fuel gas supplied to the gas-flow passage 7 can reach the first electrode layer 3 which is the fuel electrode.

The dense metal plate 2 has a smaller surface area and higher corrosion resistance than the porous metal plate 2. Additionally, since the surface area of the dense metal plate 2 is small, an oxide film formed on the surface, that is, the content of the oxide is small. Therefore, the dense metal plate 2 has higher electrical conductivity.

Figure 4:
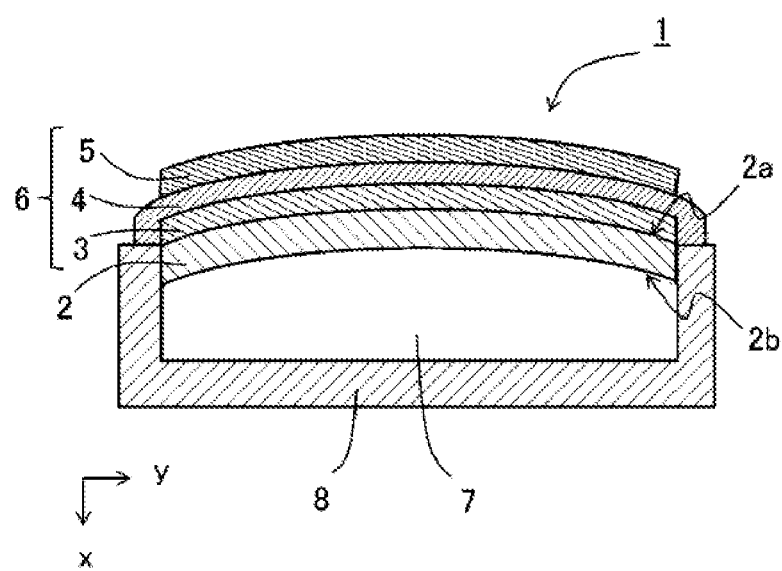
FIG. 4 is a cross-sectional view illustrating a cross section of one example of the cell.

As illustrated in FIGS. 1 and 2, the shape of the metal plate 2 may be a flat plate having the first surface 2a and the second surface 2b, which are a pair of flat surfaces facing each other. As illustrated in FIG. 4, the shape of the metal plate 2 may be a curved plate having the first surface 2a and the second surface 2b, which are a pair of curved surfaces facing each other. The thickness of the metal plate 2 may be, for example, 100 μm or more and 1 mm or less.

The material of the metal plate 2 may be, for example, a conductive material such as a heat-resistant alloy. The metal plate 2 contains Cr and may contain, for example, from 4 atomic % to 30 atomic % chromium (Cr) with respect to the entire alloy. The Cr-containing alloy may be a nickel-chromium-based alloy, an iron-chromium-based alloy, or austenite-based, ferrite-based, or austenite-ferrite-based stainless steel. Additionally, the metal plate 2 may contain manganese (Mn) or aluminum (Al) as an element other than Cr.

The metal plate 2 and the first electrode layer 3 are often bonded by thermal treatment in the air or in a nitrogen atmosphere. This is because when thermal treatment is performed in a reducing atmosphere or in a vacuum, the first electrode layer 3 or the second electrode layer 5 is likely to be sintered and is not easily made porous. During this thermal treatment, the surface of the alloy containing Cr is oxidized, and a passivation film of chromium(III) oxide ($Cr_2O_3$) is formed on the surface of the alloy. The metal plate 2 has high corrosion resistance due to this passivation film. However, $Cr_2O_3$ has low electrical conductivity and increases the electric resistance between the metal plate 2 and the first electrode layer 3 as the fuel electrode or the like.

As illustrated in FIGS. 2 and 3, the cell 1 of the present disclosure has a first intermediate layer 9 containing chromium(III) oxide ($Cr_2O_3$) and first conductive particles different from $Cr_2O_3$ between the first surface 2a of the metal plate 2 and the first electrode layer 3. The first intermediate layer 9 has electrical conductivity. As illustrated in FIG. 2, the first intermediate layer 9 may be a porous layer having an open porosity of, for example, 30% or more, in particular, in a range of from 35% to 50%. Further, as illustrated in FIG.

3, the first intermediate layer 9 may have a plurality of through holes 10 passing through the first intermediate layer 9 in the thickness direction. The first intermediate layer 9 having the plurality of through holes 10 may be a dense layer. The first intermediate layer 9 is sandwiched between the first surface 2a of the metal plate 2 and the first electrode layer 3. When the metal plate 2 has the plurality of through holes 10, the plurality of through holes 10 also pass through the first intermediate layer 9. An average thickness t1 of the first intermediate layer 9 may be, for example, 0.5 μm or more and 20 μm or less.

Since the first intermediate layer 9 contains chromium(III) oxide ($Cr_2O_3$), the durability of the metal plate 2 can be enhanced even in a high temperature reaction atmosphere. However, since $Cr_2O_3$ is an insulator having an electrical resistivity of approximately $10^{10}$ Ω·m, when the first intermediate layer 9 contains only $Cr_2O_3$, the electric resistance between the metal plate 2 and the first electrode layer 3 becomes high, and it becomes difficult for the metal plate 2 to collect the electricity generated in the element portion 6. When the first intermediate layer 9 contains $Cr_2O_3$ and further contains the first conductive particles different from $Cr_2O_3$, the conductivity of the first intermediate layer 9 becomes high, and the electricity generated in the element portion 6 can be easily collected by the metal plate 2 through the first conductive particles different from $Cr_2O_3$. As a result, the power generation efficiency of the cell 1 can be enhanced. Note that the first conductive particles different from $Cr_2O_3$ have an electrical resistivity of approximately 10 Ω·m or less.

The particle size of the first conductive particles different from $Cr_2O_3$ is smaller than the thickness t1 of the first intermediate layer 9. The particle size of the first conductive particles is, for example, less than 0.5 μm. Hereinafter, the first conductive particles different from $Cr_2O_3$ may be simply referred to as first conductive particles.

$Cr_2O_3$ tends to have a reduced electric resistance due to the other elements such as Ti and Mn in solid solution. However, electron transfer in $Cr_2O_3$ basically occurs when electrons trapped in Cr atoms hop between atoms. The amount of electrons that transfer by hopping is much smaller than the amount of free electrons that flow through a metal or the like. Therefore, even when $Cr_2O_3$ includes other elements in solid solution, the electrical conductivity is lower than that of a metal or the like. Further, since the electric resistance of $Cr_2O_3$ fluctuates depending on the type and amount of element in solid solution, and the surrounding atmosphere, for example, the oxygen partial pressure, stable characteristics cannot be obtained.

The first intermediate layer 9 of the present disclosure contains the first conductive particles different from $Cr_2O_3$. When the first conductive particles that are different from $Cr_2O_3$ are dispersed in the first intermediate layer 9, the electric resistance becomes smaller due to the conductivity of the first conductive particles themselves, and the contact between the first conductive particles forms a current path in the first intermediate layer 9, which facilitates the flow of current. Further, it is conceivable that even when the first conductive particles are not in contact with each other, the electric field strength applied to $Cr_2O_3$ between the first conductive particles becomes large, thereby facilitating flow of the current. Therefore, when the first conductive particles are dispersed, the electric resistance of the first intermediate layer 9 as a whole becomes smaller and the electrical conductivity becomes higher than when $Cr_2O_3$ includes other elements in solid solution. In particular, by using a metal having free electrons as the first conductive particles, the electrical conductivity of the entirety of the first intermediate layer 9 can be further enhanced. In the first intermediate layer 9, $Cr_2O_3$ may include other elements in solid solution, such as Ti and Mn described above, in the first intermediate layer 9.

The first conductive particles may be surrounded by the first intermediate layer 9. That is, the first conductive particles may be inside the first intermediate layer 9 and need not be exposed outside the first intermediate layer 9. When the first conductive particles are surrounded by the first intermediate layer 9, that is, $Cr_2O_3$ in the first intermediate layer, for example, even when the conductivity of the first conductive particles fluctuates due to a change in the atmosphere with which the first conductive particles are in contact, the influence of the change in the atmosphere surrounding the first intermediate layer 9 on the first conductive particles becomes small. As a result, the electrical conductivity of the first conductive particles is less likely to fluctuate. The change in the surrounding atmosphere is, for example, the change in the concentration of the fuel gas in contact with the first intermediate layer 9.

Note that the cell in which the metal plate 2 and the first electrode layer 3 are directly bonded has a lower electric resistance between the metal plate 2 and the first electrode layer 3 than the cell 1 having the passivation layer, which is the oxide film, or the first intermediate layer 9 between the metal plate 2 and the first electrode layer 3. However, in such a cell, since the metal plate 2 does not have the passivation layer, there is a concern that the corrosion resistance may be lowered.

The first intermediate layer 9 may contain, with respect to the total amount of the elements contained in the first intermediate layer 9 in terms of an oxide, for example, 50 mol % or more and 95 mol % or less of $Cr_2O_3$, and, for example, more than 5 mol % and less than 50 mol % of the first conductive particles in terms of an oxide. In addition, the first intermediate layer 9 may contain approximately 3 vol % or more and 40 vol % or less of the first conductive particles. A method for measuring the composition of the first intermediate layer 9 will be described later.

The first intermediate layer 9 may contain at least one of manganese (Mn) and aluminum (Al) in addition to $Cr_2O_3$ and the first conductive particles. For example, when the first intermediate layer 9 contains Mn, Mn may be used to form $MnCr_2O_4$, which is a spinel crystal which is a composite oxide of Cr and Mn. Mn and Al may be contained in the metal plate 2.

The first conductive particles may be, for example, metal or alloy particles, conductive oxide particles, or the like. The first conductive particles may contain metals such as Ni, Cu, Co, Fe, and Ti, or alloys thereof. Metals such as Ni, Cu, Co, Fe, and Ti or alloys thereof have an electrical resistivity of approximately $10^{-6}$ Ω·m or less and have high conductivity. Further, the first conductive particles may contain a lanthanum chromite-based perovskite oxide ($LaCrO_3$-based oxide) or a lanthanum strontium titanium-based perovskite oxide ($LaSrTiO_3$-based oxide). These perovskite oxides have an electrical resistivity of approximately 10 Ω·m or less, and have electrical conductivity, and are neither reduced nor oxidized even when the perovskite oxides come into contact with a fuel gas such as a hydrogen-containing gas and an oxygen-containing gas such as air. These metals or alloys and perovskite oxides are stable even at a high temperature and have high electrical conductivity, so that the electricity generated in the element portion 6 can be easily collected by the metal plate 2.

In particular, the metal Ni not only has high electrical conductivity, but its conductivity is unlikely to fluctuate due to a change in atmosphere. Therefore, the metal Ni can maintain high electrical conductivity even in a high temperature reaction atmosphere. Accordingly, the metal Ni can maintain stable electrical conductivity even when the surrounding atmosphere, for example, the concentration of the fuel gas fluctuates. Further, Ni is contained in the first electrode layer 3, which is the fuel electrode, and the first intermediate layer 9 contains the first conductive particles containing Ni, so that the joining properties between the first intermediate layer 9 and the first electrode layer 3 can be enhanced.

Figure 5:
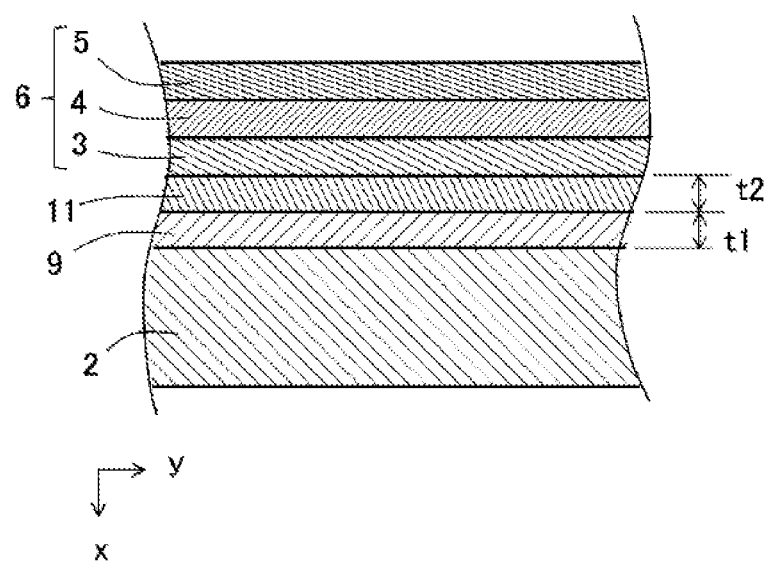
FIG. 5 is an enlarged cross-sectional view illustrating the portion surrounded by the dashed line in the one example in FIG. 1.
Figure 6:
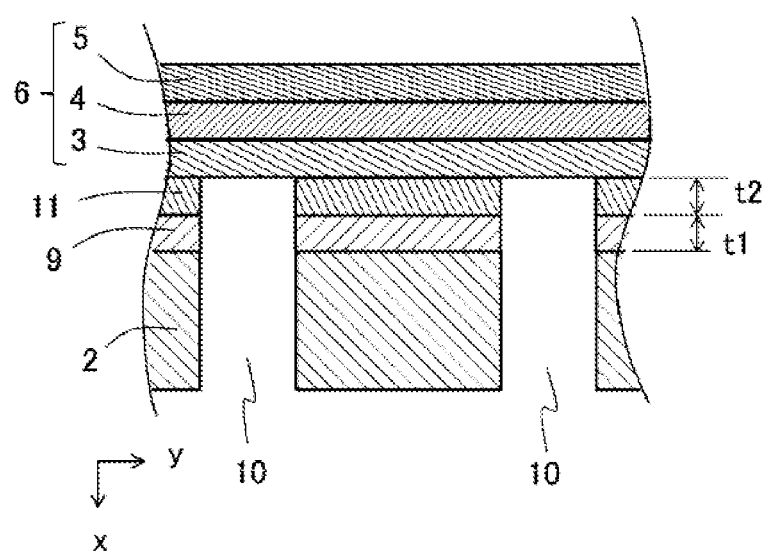
FIG. 6 is an enlarged cross-sectional view illustrating the portion surrounded by the dashed line in the one example in FIG. 1.
Figure 7:
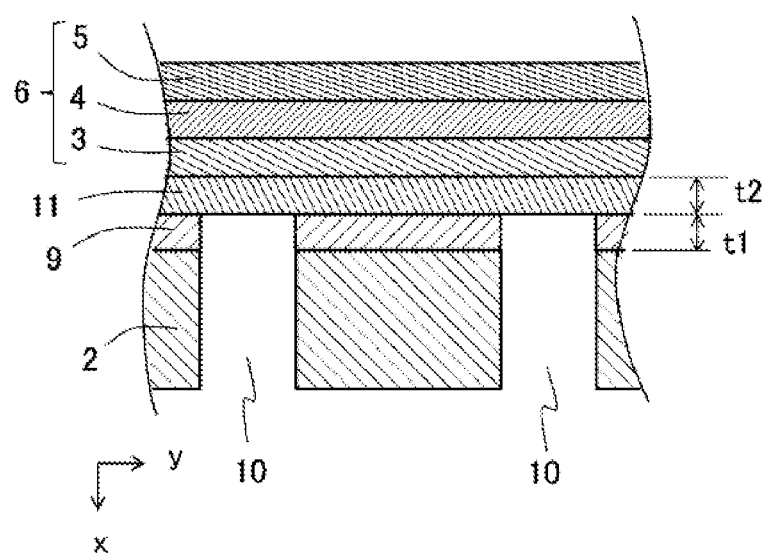
FIG. 7 is an enlarged cross-sectional view illustrating the portion surrounded by the dashed line in the one example in FIG. 1.

As illustrated in FIG. 5, the cell 1 may further include a second intermediate layer 11, that is porous, between the first intermediate layer 9 and the first electrode layer 3. The second intermediate layer 11 also has gas permeability and electrical conductivity. The second intermediate layer 11 may have an open porosity of, for example, 30% or more, in particular, in a range of from 35% to 50%. When the metal plate 2 has the through holes 10, the through holes 10 may pass through the second intermediate layer 11 in the thickness direction as illustrated in FIG. 6, or need not pass through the second intermediate layer 11 as illustrated in FIG. 7.

The second intermediate layer 11 may be thicker than the first intermediate layer 9. A thickness t2 of the second intermediate layer 11 may be, for example, 10 μm or more and 200 μm or less. As illustrated in FIGS. 5 to 7, the thickness t2 of the second intermediate layer 11 is the thickness of the second intermediate layer 11 located between the first intermediate layer 9 and the first electrode layer 3, and may be the distance between the first intermediate layer 9 and the first electrode layer 3. When the thickness t2 of the second intermediate layer 11 is thicker than the thickness t1 of the first intermediate layer 9, Cr contained in the first intermediate layer 9 is less likely to diffuse into the first electrode layer 3.

When the second intermediate layer 11 has the above-mentioned open porosity, that is, an open porosity of 30% or more, the second intermediate layer 11 may fill at least a part of the through holes 10. That is, the thickness of the second intermediate layer 11 located above the through holes 10 illustrated in FIG. 7 may be larger than t2. The thickness of the second intermediate layer 11 located above the through holes 10 illustrated in FIG. 7 may be smaller than t2.

The second intermediate layer 11 may contain second conductive particles. When the second intermediate layer 11 contains the second conductive particles, the electricity generated in the element portion 6 can be easily collected by the metal plate 2. The second conductive particles contained in the second intermediate layer 11 may be the above-mentioned metal or alloy particles, conductive oxide particles, or the like. The material of the second conductive particles contained in the second intermediate layer 11 may be the same as or different from the first conductive particles contained in the first intermediate layer 9 described above.

The second conductive particles contained in the second intermediate layer 11 may contain a metal element having electrical conductivity in a reduced state. The metal elements having electrical conductivity in the reduced state include, for example, Ni, Cu, Co, and Zn. When the first electrode layer 3 is the fuel electrode, the second intermediate layer 11, that is porous, comes into contact with the fuel gas such as a reductive hydrogen-containing gas at a high temperature. Since the second intermediate layer 11 is porous and has a large surface area, the second conductive particles contained in the second intermediate layer 11 are easily reduced under a reducing atmosphere. Since the second conductive particles contained in the second intermediate layer 11 contain a metal element having electrical conductivity in a reduced state, the second intermediate layer 11 can have high conductivity even in a reducing atmosphere, and the electricity generated in the element portion 6 can be easily collected by the metal plate 2.

Note that the first conductive particles contained in the first intermediate layer 9, that is porous, may also contain a metal element having electrical conductivity in a reduced state. The first intermediate layer 9, that is dense, may contain an oxide as the first conductive particles. Since the first intermediate layer 9, that is dense, has a small surface area, the first conductive particles, which are the oxide contained in the first intermediate layer 9 are less likely to be reduced under a reducing atmosphere.

The second intermediate layer 11 may further contain an inorganic oxide. Examples of the inorganic oxide contained in the second intermediate layer 11 include oxides of Ti, Zr, Al, Si, Mg, Ca, Sr, and Ba, and rare earth oxides such as oxides of Y, Yb, Ce, and Gd. The inorganic oxide contained in the second intermediate layer 11 may be, for example, stabilized zirconia, a rare earth oxide, an $ABO_3$ perovskite oxide, or a titanium oxide. Note that an example of the rare earth oxide is yttrium oxide ($Y_2O_3$).

When the first electrode layer 3 is the fuel electrode, the second intermediate layer 11 may contain stabilized zirconia or a rare earth oxide contained in the fuel electrode. When the first electrode layer 3 is the air electrode, the second intermediate layer 11 may contain an electrically conductive $ABO_3$ perovskite oxide contained in the air electrode. Since the second intermediate layer 11 contains the same inorganic oxide as the inorganic oxide contained in the first electrode layer 3, the adhesive strength between the first electrode layer 3 and the metal plate 2 can be increased.

The second intermediate layer 11 may contain at least one kind of inorganic oxide from among Ti, Al, and Si. When the second intermediate layer 11 contains the inorganic oxides of Ti, Al, and Si, the components of the second conductive particles contained in the second intermediate layer 11 are likely to dissolve or diffuse in the first intermediate layer 9, and the ratio of the first conductive particles contained in the first intermediate layer 9 becomes larger, whereby the electrical conductivity of the first intermediate layer 9 can be made higher.

When the second intermediate layer 11 contains the second conductive particles and the inorganic oxide, with respect to the total amount of the elements contained in the second intermediate layer 11 in terms of an oxide, the ratio of the second conductive particles may be, for example, 40 mol % or more and 80 mol % or less, and the ratio of the inorganic oxide may be, for example, more than 20 mol % and less than 60 mol %.

Figure 8:
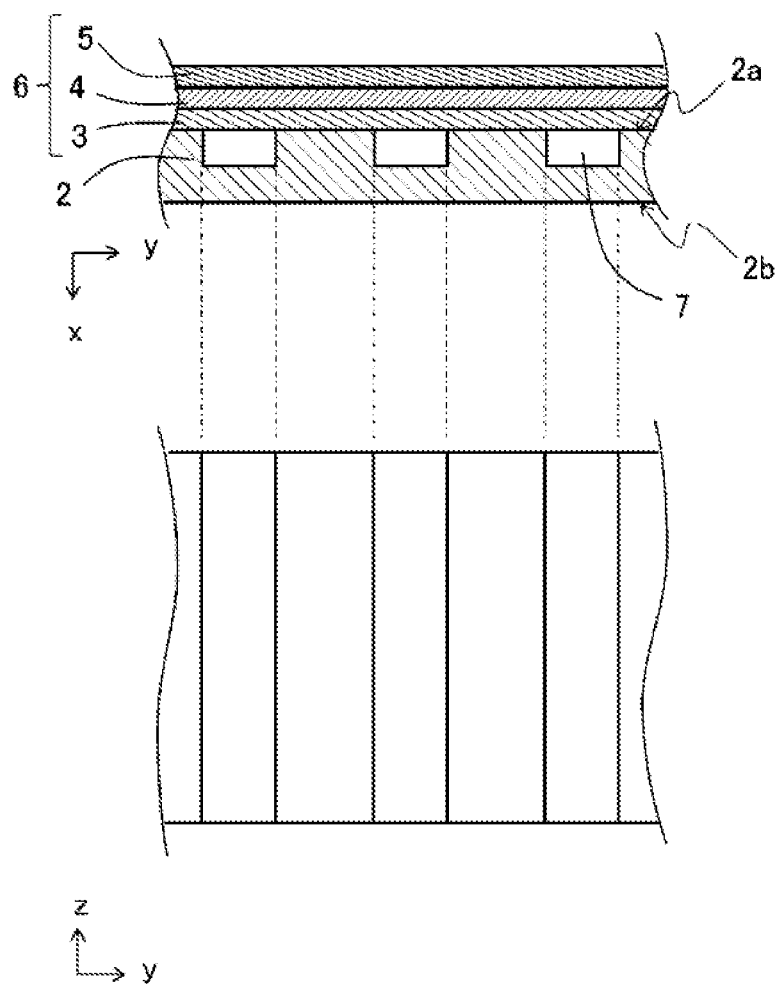
FIG. 8 is a horizontal cross-sectional view illustrating one example of the cell and a plan view of a first surface of a metal plate.

The metal plate 2 may have recessed portions or projecting portions on at least one of the first surface 2a and the second surface 2b. FIG. 8 illustrates one example of the cell 1 provided with the metal plate 2 having recessed portions on the first surface 2a. A figure illustrated on the top side of FIG. 8 is a horizontal cross-sectional view of the cell 1, and a figure illustrated on the bottom side of FIG. 8 is a plan view of the first surface 2a of the metal plate 2. As illustrated in FIG. 8, when the metal plate 2 has the recessed portions on the first surface 2a, the recessed portions need not be in contact with the first electrode layer 3. That is, the metal plate 2 may have gaps between the recessed portions of the first surface 2a and the first electrode layer 3. In this case, the gaps between the recessed portions of the first surface 2a and the first electrode layer 3 may be used as the gas-flow passages 7. In the cell 1 illustrated in FIG. 8, the metal plate 2 also serves as the flow path member 8, so that the metal plate 2 need not have gas permeability between the first surface 2a and the second surface 2b.

Figure 9:
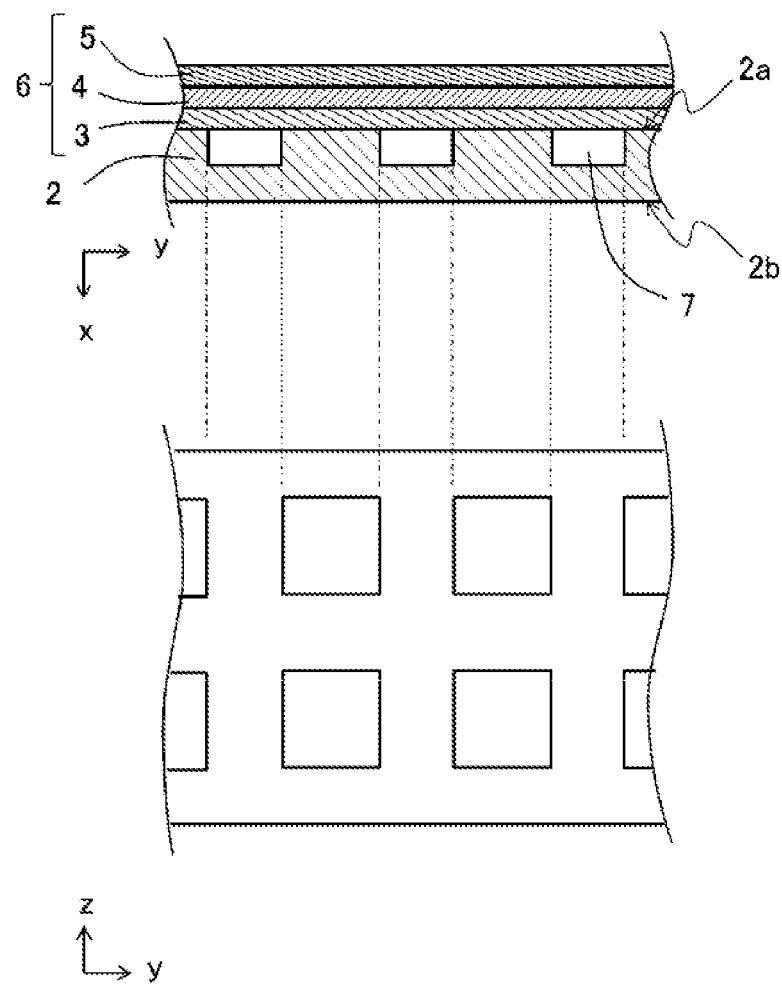
FIG. 9 is a horizontal cross-sectional view illustrating one example of the cell and a plan view of the first surface of the metal plate.

FIG. 9 illustrates one example of the cell 1 provided with the metal plate 2 having the projecting portions on the first surface 2a. A figure illustrated on the top side of FIG. 9 is a horizontal cross-sectional view of the cell 1, and a figure illustrated on the bottom side of FIG. 9 is a plan view of the first surface 2a of the metal plate 2. As illustrated in FIG. 9, when the metal plate 2 has projecting portions on the first surface 2a, only the projecting portions need be in contact with the first electrode layer 3. The cell 1 such as that described above has gaps between portions other than the projecting portions of the first surface 2a of the metal plate 2 and the first electrode layer 3, and these gaps may be used as the gas-flow passages 7. In the cell 1 illustrated in FIG. 9, the metal plate 2 also serves as the flow path member 8, so that the metal plate 2 need not have gas permeability between the first surface 2a and the second surface 2b.

Figure 10:
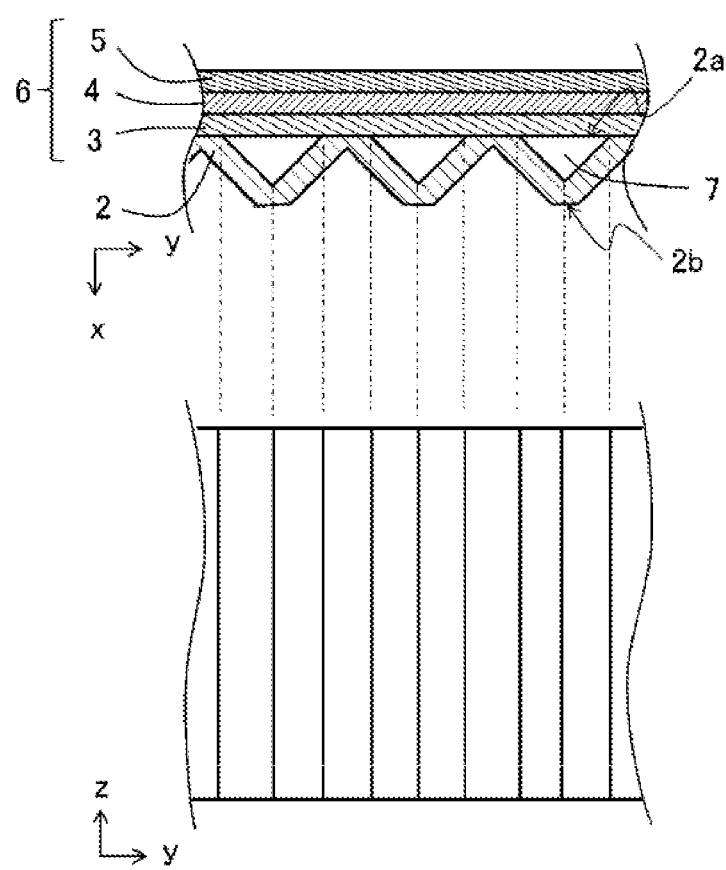
FIG. 10 is a horizontal cross-sectional view illustrating one example of the cell and a plan view of the first surface of the metal plate.

As illustrated in FIG. 10, the metal plate 2 may have recessed portions and projecting portions on both the first surface 2a and the second surface 2b. A figure illustrated on the top side of FIG. 10 is a horizontal cross-sectional view of the cell 1, and a figure illustrated on the bottom side of FIG. 10 is a plan view of the first surface 2a of the metal plate 2. As illustrated in FIG. 10, the projecting portions of the first surface 2a of the metal plate 2 may be in contact with the first electrode layer 3. The cell 1 such as that described above has gaps between the recessed portions of the first surface 2a of the metal plate 2 and the first electrode layer 3, and these gaps may be used as the gas-flow passages 7. In the cell 1 illustrated in FIG. 10, the metal plate 2 also serves as the flow path member 8, so that the metal plate 2 need not have gas permeability between the first surface 2a and the second surface 2b.

The cells 1 illustrated in FIGS. 8 to 10 also include the above-mentioned first intermediate layer 9 between the first surface 2a and the first electrode layer 3. The cells 1 illustrated in FIGS. 8 to 10 may further include the second intermediate layer 11.

Evaluation Method

The presence or absence of the first intermediate layer 9 and the second intermediate layer 11 can be confirmed, for example, by observing a cross section of the cell 1 with a scanning electron microscope (SEM), a scanning transmission electron microscope (STEM), a transmission electron microscope (TEM), or the like. The elements contained in the first intermediate layer 9 and the second intermediate layer 11 and the content ratios thereof can be analyzed with, for example, wavelength dispersive X-ray spectroscopy (WDS), energy dispersive X-ray spectroscopy (EDS), or an electron probe microanalyzer (EPMA). From the obtained elemental analysis results, the molar ratios of $Cr_2O_3$, the first or second conductive particles, and the inorganic oxide in terms of an oxide can be calculated. Further, as necessary, the first intermediate layer 9 or the second intermediate layer 11 may be cut out from the cell 1, and elemental analysis such as high-frequency inductively coupled plasma (ICP) emission spectroscopy may be performed.

The volume ratio of the first conductive particles contained in the first intermediate layer 9 or the second conductive particles contained in the second intermediate layer 11 may be calculated based on the calculated molar ratios of $Cr_2O_3$, the first or second conductive particles, and the inorganic oxide. The volume ratio of the first conductive particles contained in the first intermediate layer 9 may be obtained, for example, by performing element mapping of a cross section of the first intermediate layer 9, calculating an area occupancy ratio of the elements contained in the first conductive particles by image analysis, and converting the area occupancy ratio into the volume ratio. The volume ratio of the second conductive particles contained in the second intermediate layer 11 may be obtained by image analysis of the element mapping image of the cross section of the second intermediate layer 11.

Method of Manufacturing Cell

A method of manufacturing the cell 1 provided with the first intermediate layer 9 when the first electrode layer 3 is used as the fuel electrode will be described. As the metal plate 2, a base member such as stainless steel containing Cr is prepared. The base member may be an alloy plate or an alloy foil. When the metal plate 2 has gas permeability, the base member may be an alloy plate or an alloy foil having the through holes 10, or may be a porous sintered body made of a metal powder. Further, a laminate formed of the fuel electrode and stabilized zirconia to be the solid electrolyte layer 4 is prepared. The fuel electrode contains Ni and/or NiO and stabilized zirconia.

The laminate of the fuel electrode and the solid electrolyte layer 4 may be produced by the following method. A binder is added to a slurry obtained by mixing a Ni or NiO powder and a stabilized zirconia powder with an organic solvent to form a sheet, thereby obtaining a sheet compact for the fuel electrode. A binder is added to the slurry in which stabilized zirconia powder is mixed with an organic solvent, and sheet forming is performed on the sheet compact for the fuel electrode to obtain a laminated compact. The obtained laminated compact is fired to obtain the laminate of the fuel electrode and the solid electrolyte layer 4.

The base member and the laminate of the fuel electrode, that is, the first electrode layer 3 and the solid electrolyte layer 4, are bonded with an adhesive. As the adhesive, a paste is used containing at least one of the conductive particles of Ni, NiO, Cu, Co, and Zn, and as the inorganic oxide, at least one of oxides such as oxides of Ti, Zr, Al, Si, Mg, Ca, Sr, and Ba and rare earth oxides such as oxides of Y and Yb. The adhesive may contain not only one kind of conductive particles but also two or more kinds, and may contain not only one kind of inorganic oxide but also two or more kinds. Further, the inorganic oxide may be a composite oxide of two or more kinds of elements.

The adhesive is applied to the first surface 2a of the base member, and the first surface 2a of the base member to which the adhesive has been applied is bonded to the surface of the first electrode layer 3 of the laminate. The bonded base member and the laminate are thermally treated in a nitrogen atmosphere or in the air, for example, in a range of from 1000° C. to 1200° C. for 0.5 hours to 2 hours. A $Cr_2O_3$ film in which the first conductive particles such as Ni, Cu, Co, and Zn are dispersed is formed between the base member and the first electrode layer 3 after the thermal treatment.

Note that when the thermal treatment is performed in a reducing atmosphere, the oxides constituting the fuel electrode are reduced, and the particles of the material contained in the fuel electrode are likely to grow. As a result, sintering of the fuel electrode may proceed and it may be difficult for the fuel electrode and the fuel gas to react with each other, and the electric resistance of the fuel electrode may increase.

The second intermediate layer 11 may be formed between the base member and the first electrode layer 3 depending on the kind of inorganic oxide contained in the adhesive, the coating thickness of the adhesive, the thermal treatment conditions, and the like. In some cases, the constituent components of the adhesive diffuse into the base member or the first electrode layer 3, and a clear second intermediate layer 11 is not formed. For example, when the coating thickness of the adhesive is 10 μm or more, or when the thermal treatment time is short, the constituent components of the adhesive do not diffuse into the base member or the first electrode layer 3 and easily remain at the interface, so that the second intermediate layer 11 is easily formed. On the other hand, when the coating thickness of the adhesive is less than 1 μm, or when the thermal treatment time is long, most of the constituent components of the adhesive are diffused into the base member or the first electrode layer 3 and hardly remain at the interface, so that it is difficult to form the clear second intermediate layer 11.

When the adhesive contains titanium oxide (titania), the melting point of the adhesive is lowered, the adhesive is easily sintered, and the components of the conductive particles easily dissolve and diffuse in the first intermediate layer 9 and the first electrode layer 3. Further, Ti can form a solid solution with chromium oxide of the first intermediate layer 9 to make the first intermediate layer 9 more electrically conductive.

In addition, when the adhesive contains any of titania, aluminum oxide (alumina), and silicon oxide (silica), the coefficient of thermal expansion of the adhesive layer, that is, the second intermediate layer 11 becomes small. When the first electrode layer 3 is the fuel electrode, the difference between the coefficient of thermal expansion of the second intermediate layer 11 and the coefficients of thermal expansion of the metal plate 2 and the first electrode layer 3 becomes small, so that the second intermediate layer 11 and the metal plate 2, and the second intermediate layer 11 and the first electrode layer 3 are less likely to be separated from each other. In addition, these inorganic oxides facilitate the transfer of the components of the conductive particles contained in the adhesive to the chromium oxide layer which is to be the first intermediate layer 9 on the surface of the base member.

When the adhesive contains Ni/NiO, titanium oxide (titania), and yttrium oxide together, Ni/NiO and titanium oxide (titania) react with yttrium oxide to form a composite oxide such as $Y_2Ti_2O_7$ or $Y_2Ti_2O_7$ including NiO in solid solution. The crystal phase of this composite oxide is stable in a reducing atmosphere, the crystal structure is less likely to change due to the effect of the atmosphere, and breakage due to volume change associated with the phase transformation of the crystal is unlikely to occur.

The cell 1 of the present disclosure can be obtained by forming an air electrode, which is the second electrode layer 5, on the surface of the solid electrolyte layer 4 of the base member and the laminate bonded with the adhesive. The air electrode may be obtained, for example, by adding a binder to the slurry obtained by mixing electrically conductive $ABO_3$ perovskite oxide powder with an organic solvent, printing on the surface of the solid electrolyte layer 4, and then firing at 1000° C. to 1200° C. in an oxidizing atmosphere together with the base member and the laminate.

In the above-mentioned example of the manufacturing method, the laminate of the first electrode layer 3 and the solid electrolyte layer 4 is prepared in advance, and then the laminate is bonded to the base member. However, the first electrode layer 3 and the solid electrolyte layer 4 may be sequentially formed on the metal plate 2 without preparing the laminate of the first electrode layer 3 and the solid electrolyte layer 4. For example, a sheet compact to be the first electrode layer 3 may be adhered to the metal plate 2 to which the adhesive has been applied, and a sheet to be the solid electrolyte layer 4 may be further formed on the sheet compact, and then they may be fired. After firing the metal plate 2 and the first electrode layer 3 adhered to each other with the adhesive, the solid electrolyte layer 4 may be formed on the surface of the fired first electrode layer 3 by, for example, a vacuum film formation method such as PVD.

Cell Stack Device

Figure 11:
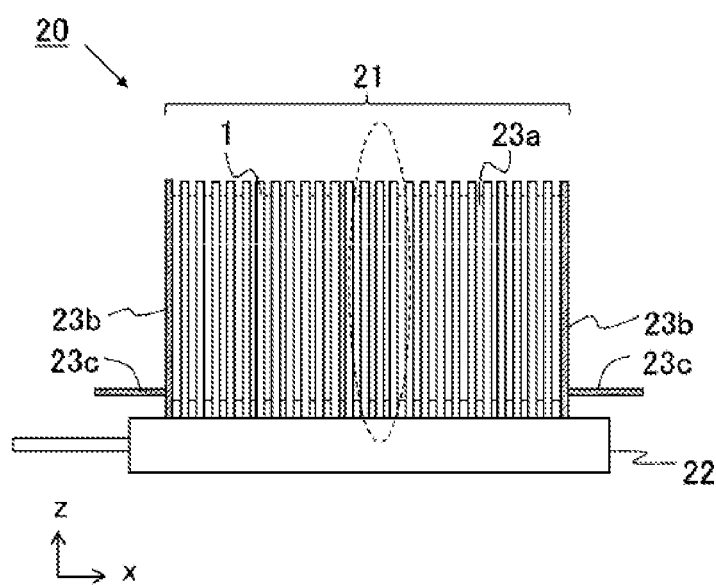
FIG. 11 is a side view schematically illustrating one example of a cell stack device.

As illustrated in FIG. 11, a cell stack device 20 includes a cell stack 21 in which a plurality of cells 1 are disposed and a gas tank 22. A lower end portion of the cell 1 is bonded to and fixed to an opening portion of the gas tank 22. The gas tank 22 supplies fuel gas to the plurality of cells 1.

The cell stack 21 includes the plurality of cells 1 disposed or stacked in the thickness direction of the cell 1, and conductive members 23a that electrically connect adjacent ones of the cells 1 in series. Each of the cells 1 is the cell 1 including the first intermediate layer 9 described above. The direction in which the plurality of cells 1 are disposed is referred to as an arrangement direction x.

The conductive members 23a may also be disposed on the two ends of the cell stack 21 in the arrangement direction x. The conductive members 23a may be bonded to the cells 1 with a conductive adhesive. As a material of the conductive members 23a, an elastic metal or alloy may be used, or felt made of metal fiber or alloy fiber may be used. The felt made of metal fiber or alloy fiber may be surface-treated as needed.

As illustrated in FIG. 11, the cell stack device 20 includes end conductive members 23b outside the cell stack 21 in the arrangement direction x. The end conductive members 23b are electrically connected to the cells 1 located on the outermost sides in the arrangement direction x. Each of the end conductive members 23b includes a lead-out portion 23c that protrudes outward in the arrangement direction x. The lead-out portions 23c collect the electricity generated in the cells 1 and draw out the collected electricity to the outside.

Figure 12:
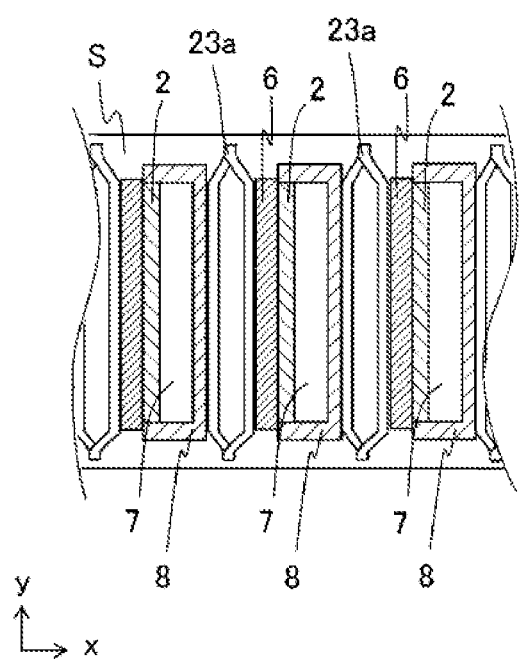
FIG. 12 is an enlarged horizontal cross-sectional view of a portion of the cell stack device illustrated in FIG. 11 surrounded by a dashed line.

FIG. 12 is an enlarged horizontal cross-sectional view of a portion surrounded by a dashed line in FIG. 11. As illustrated in FIG. 12, the lower end portion of the cell 1 is fixed to the opening portion of the gas tank 22 with a sealing member S. The gas-flow passage 7 of the cell 1 leads to a fuel gas chamber (not illustrated) of the gas tank 22. A material of the sealing member S may be, for example, glass having excellent thermal resistance.

The lower end portions of the conductive members 23a and the end conductive members 23b may be fixed to the gas tank 22 with the sealing member S. The end conductive members 23b may be integrated with the cell stack 21.

Module

Figure 13:
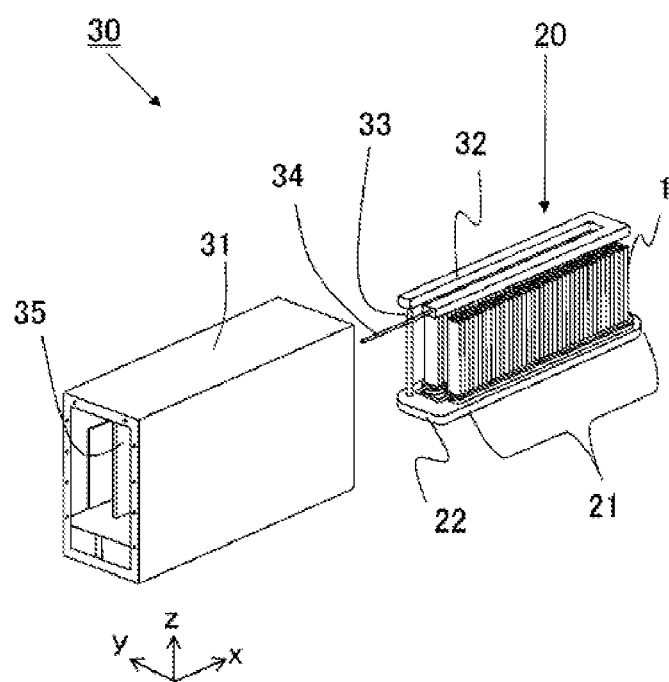
FIG. 13 is an exterior perspective view illustrating one example of a module.

FIG. 13 is an exterior perspective view illustrating one example of a module including a cell stack device.

A module 30 includes a rectangular parallelepiped-shaped housing container 31 and the above-mentioned cell stack device 20 housed inside the housing container 31. A reformer 32 is disposed above the cell stack 21. The reformer 32 is connected to the gas tank 22 by a gas flow pipe 33. The reformer 32 reforms raw fuel such as natural gas or kerosene supplied via a raw fuel supply pipe 34 to produce fuel gas. The gas flow pipe 33 supplies the fuel gas reformed by the reformer 32 to the gas tank 22. The fuel gas is supplied from the gas tank 22 to the gas-flow passage 7 of the cell 1.

FIG. 13 illustrates a state in which a front surface portion and a rear surface portion, which are parts of the housing container 31, are removed, and the cell stack device 20 housed inside the housing container 31 is taken out rearward. In the module 30 illustrated in FIG. 13, the cell stack device 20 can be slid and housed in the housing container 31. The cell stack device 20 need not include the reformer 32.

The housing container 31 includes an oxygen-containing-gas inlet member 35 therein. The oxygen-containing-gas inlet member 35 in FIG. 13 is disposed between the two cell stacks 21 in a state in which the cell stack device 20 is housed in the housing container 31. The oxygen-containing-gas inlet member 35 supplies the oxygen-containing gas to the lower end portion of the cell 1. The oxygen-containing gas flows along the side of the cell 1 from the lower end portion to the upper end portion in synchronization with the flow of the fuel gas by the oxygen-containing-gas inlet member 35. The fuel gas discharged from the gas-flow passage 7 of the cell 1 to the upper end portion of the cell 1 is mixed with the oxygen-containing gas and burned. By burning the fuel gas discharged at the upper end portion of the cell 1, the temperature of the cell 1 rises, and the activation of the cell stack device 20 can be accelerated. In addition, by burning the fuel gas at the upper end portion of the cell 1, the reformer 32 disposed above the cell 1 is heated, and the reformer 32 can efficiently perform a reformation reaction.

Module Housing Device

Figure 14:
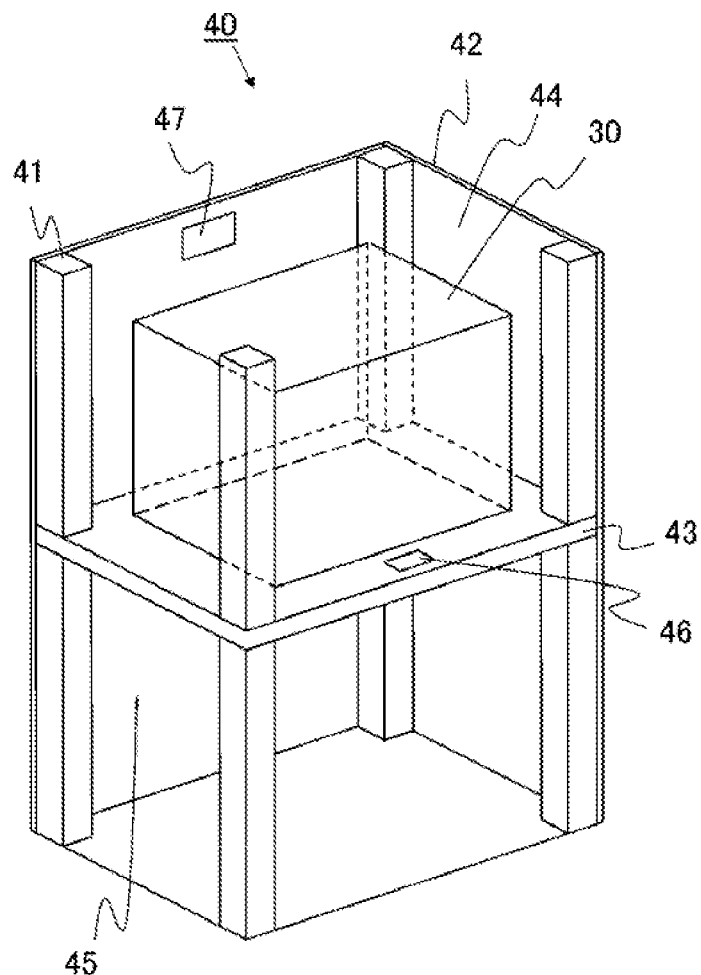
FIG. 14 is a perspective view illustrating one example of a module housing device.

FIG. 14 is an exploded perspective view illustrating one example of a module housing device. Note that some configurations are omitted in FIG. 14. The module housing device includes an external case, a module housed in the external case, and an auxiliary device configured to operate the module and housed in the external case.

A module housing device 40 illustrated in FIG. 14 has supports 41 and exterior plates 42. A dividing plate 43 divides the inside of the external case into upper and lower spaces. A space above the dividing plate 43 in the external case is a module housing chamber 44 that houses the module 30, and a space below the dividing plate 43 in the external case is an auxiliary device housing chamber 45 that houses the auxiliary device for operating the module 30. Note that the description of the auxiliary device to be housed in the auxiliary device housing chamber 45 is omitted.

The dividing plate 43 has an air flow port 46 for allowing the air in the auxiliary device housing chamber 45 to flow into the module housing chamber 44. One of the exterior plates 42 forming the module housing chamber 44 has an exhaust hole 47 for exhausting the air in the module housing chamber 44. The air in the module housing chamber 44 is exhausted from the exhaust hole 47.

Since the module 30 described above is provided in the module housing chamber 44, the module housing device 40 can have high power generation efficiency.

The present disclosure has been described in detail above. However, the present disclosure is not limited to the embodiments described above. The cell, the cell stack device, the module, and the module housing device of the present disclosure may be variously modified, improved, and the like without departing from the gist of the present disclosure.

For example, in the cell stack device 20 described above, an example is illustrated in which the fuel gas is supplied to the gas-flow passage 7 in the cell 1 and the oxygen-containing gas is supplied to the outside of the cell 1. However, the oxygen-containing gas may be supplied to the gas-flow passage 7, and the fuel gas may be supplied to the outside of the cell 1.

Further, in the above description, the fuel cell, the fuel cell stack device, the fuel cell module, and the fuel cell device are respectively illustrated as one example of the "cell", the "cell stack device", the "module", and the "module housing device". However, in another example, the "cell", the "cell stack device", the "module", and the "module housing device" may be an electrolysis cell, an electrolysis cell stack device, an electrolysis module, and an electrolysis device, respectively.

EXAMPLES

A base member having 81 through holes/cm$^2$ with a diameter of 0.3 mm formed on a stainless steel plate having a thickness of 0.3 mm containing Cr was prepared. In addition, a laminate of a fuel electrode, which is a mixture of NiO and stabilized zirconia, and a solid electrolyte layer made of stabilized zirconia was prepared. The fuel electrode contains 60% by mass of NiO and 40% by mass of stabilized zirconia. Stabilized zirconia contained in the fuel electrode and the solid electrolyte layer contains 8 mol % yttrium in the form of $Y_2O_3$. The laminate was fired in the air at a maximum temperature of 1400° C. for two hours to become integrated.

As an adhesive, a material to which a $TiO_2$ powder and a $Y_2O_3$ powder were added instead of stabilized zirconia contained in the fuel electrode, that is, a material A containing NiO, $TiO_2$, and $Y_2O_3$ was prepared. The composition of the material A was 65% by mass of NiO, 10% by mass of $TiO_2$, and 25% by mass of $Y_2O_3$.

A paste of the material A was prepared and applied to the surface of the base member which is stainless steel. The coating thickness of the adhesive was 50 μm. After the surface of the base member coated with the adhesive and the surface of the fuel electrode of the laminate were bonded together, thermal treatment was performed in the air at a maximum temperature of 1050° C. for two hours to bond the base member and the fuel electrode to obtain a joint body.

The electrical resistivity of the obtained joint body was measured as follows. $LaSrCoO_3$ was baked onto the solid electrolyte layer to obtain an electrode with a diameter of 10 mm. A platinum mesh was attached to the surface of the base member facing the electrode, that is, the surface having no power generation element, and used as a counter electrode. The electrical resistivity was measured by an AC four-terminal method.

Further, as a comparative example, the electrical resistivity of the base member that was thermally treated under the same conditions without applying the adhesive was measured. While the electrical resistivity of the comparative example was 7.06 Ω·m, the electrical resistivity of the entire intermediate layer including the first intermediate layer and the second intermediate layer of the joint body using the material A was 0.047 Ω·m.

The cross-sections of the comparative example and the joint body using the material A were confirmed by a scanning electron microscope (SEM). Elemental analysis of the cross section of each sample was performed using energy dispersive X-ray spectroscopy (EDS). In the reflection electron image obtained by the SEM, a dense chromium oxide layer having a contrast different from that of metal was formed on the surface of the base member of the comparative example, and no particles containing other elements, that is, the first conductive particles, were detected in the chromium oxide layer. Each of the joint body using the material A had, between the base member and the fuel electrode, a first intermediate layer containing chromium oxide and the first conductive particles containing Ni, and a second intermediate layer containing the second conductive particles that were porous and contained Ni, and inorganic oxides such as zirconia, $TiO_2$, and $Y_2O_3$.

The first intermediate layer of the joint body using the material A had an average thickness of 6 μm, and contained 80 mol % of chromium oxide and 20 mol % of Ni and Ti in terms of an oxide in total. The second intermediate layer had an average thickness of 50 μm and an open porosity of 40%, and contained 30 mol % of Ti and Y in terms of an oxide in total, and 70 mol % of Ni in terms of an oxide.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST

1 Cell
2 Metal plate
3 First electrode layer
4 Solid electrolyte layer
5 Second electrode layer
6 Element portion
7 Gas-flow passage
8 Flow path member
9 First intermediate layer
10 Through hole
11 Second intermediate layer
20 Cell stack device
21 Cell stack
22 Gas tank
30 Module
31 Housing container
32 Reformer
33 Gas flow pipe
40 Module housing device

The invention claimed is:

1. A cell comprising:
a metal plate comprising a first surface, and a second surface that faces the first surface, the metal plate containing Cr;
an element portion disposed on the first surface, the element portion comprising a first electrode layer, a solid electrolyte layer located on and in direct contact with the first electrode layer, and a second electrode layer located on the solid electrolyte layer; and
a first intermediate layer located between the first surface and the first electrode layer, wherein
the first intermediate layer contains $Cr_2O_3$ and a first conductive particle different from $Cr_2O_3$.

2. The cell according to claim 1, wherein a particle size of the first conductive particle is smaller than a thickness of the first intermediate layer.

3. The cell according to claim 1, wherein the first conductive particle contains Ni.

4. The cell according to claim 1, further comprising: a second intermediate layer, that is porous, between the first intermediate layer and the first electrode layer.

5. The cell according to claim 4, wherein the second intermediate layer is thicker than the first intermediate layer.

6. The cell according to claim 4, wherein the second intermediate layer contains a second conductive particle.

7. The cell according to claim 6, wherein the second intermediate layer further contains an inorganic oxide.

8. A cell stack device comprising: a cell stack comprising a plurality of cells, the plurality of cells comprising the cell according to claim 1.

9. A module comprising:
a housing container; and
the cell stack device according to claim 8 housed in the housing container.

10. A module housing device comprising:
an external case;
the module according to claim 9 housed in the external case; and
an auxiliary device housed in the external case, and configured to operate the module.

11. A cell comprising:
a metal plate comprising a first surface, and a second surface that faces the first surface, the metal plate containing Cr;
an element portion disposed on the first surface, the element portion comprising a first electrode layer, a solid electrolyte layer located on and in direct contact with the first electrode layer, and a second electrode layer located on the solid electrolyte layer; and
a first intermediate layer located between the first surface and the first electrode layer, wherein
the first intermediate layer contains $Cr_2O_3$ and a metal or alloy particle including Ni.

12. The cell according to claim 11, further comprising:
a second intermediate layer, that is porous, between the first intermediate layer and the first electrode layer, wherein
the second intermediate layer is thicker than the first intermediate layer.

13. The cell according to claim 12, wherein the second intermediate layer contains a conductive particle.

14. The cell according to claim 13, wherein the second intermediate layer further contains an inorganic oxide.

15. A cell stack device comprising: a cell stack comprising a plurality of cells, the plurality of cells comprising the cell according to claim 11.

16. A module comprising:
a housing container; and
the cell stack device according to claim 15 housed in the housing container.

17. A module housing device comprising:
an external case;
the module according to claim 16 housed in the external case; and
an auxiliary device housed in the external case, and configured to operate the module.

* * * * *